United States Patent [19]

Givens et al.

[11] Patent Number: 4,686,477

[45] Date of Patent: Aug. 11, 1987

[54] MULTIPLE FREQUENCY ELECTRIC EXCITATION METHOD AND IDENTIFYING COMPLEX LITHOLOGIES OF SUBSURFACE FORMATIONS

[75] Inventors: Wyatt W. Givens, Dallas; Edgar A. Bowden, Arlington, both of Tex.

[73] Assignee: Mobil Oil Corporation, New York, N.Y.

[21] Appl. No.: 781,628

[22] Filed: Sep. 30, 1985

[51] Int. Cl.$^4$ .......................... G01V 3/24; G01V 3/06
[52] U.S. Cl. .................. 324/366; 324/371; 324/376
[58] Field of Search ............... 324/357, 362, 364, 366, 324/371, 64, 335

[56] References Cited

U.S. PATENT DOCUMENTS

| | | | |
|---|---|---|---|
| 2,766,421 | 10/1956 | Wait et al. | 324/357 |
| 2,929,984 | 3/1960 | Puranen et al. | 324/335 |
| 2,966,627 | 12/1960 | Hawkins | 324/364 X |
| 2,988,690 | 6/1961 | Love et al. | 324/357 |
| 3,382,428 | 5/1968 | Sherwood et al. | 324/357 |
| 3,967,190 | 6/1976 | Zonge | 324/362 |
| 4,010,413 | 3/1977 | Daniel | 324/335 |
| 4,359,687 | 11/1982 | Vinegar et al. | 324/362 X |
| 4,361,808 | 11/1982 | Kern et al. | 324/366 |
| 4,464,930 | 8/1984 | Givens | 73/152 |
| 4,629,990 | 12/1986 | Zandee | 324/335 X |

FOREIGN PATENT DOCUMENTS

0737904 5/1980 U.S.S.R. .............................. 324/335

OTHER PUBLICATIONS

"Electrical Conductivities in Oil-Bearing Shaly Sands", M. H. Waxman and L. J. M. Smits, *Society of Petroleum Engineers Journal*, June, 1968, pp. 107–122.
"Electrical Conductance in a Porous Medium", A. E. Bussian, *Geophysics*, vol. 48, No. 9, Sept., 1983, pp. 1258–1268.
"The Electrical Resistivity Log as an Aid in Determining Some Reservoir Characteristics", G. E. Archie, Trans. AIME, vol. 46, pp. 54–62, 1942.

*Primary Examiner*—Gerard R. Strecker
*Attorney, Agent, or Firm*—Alexander J. McKillop; Michael G. Gilman; George W. Hager, Jr.

[57] ABSTRACT

A method of identifying complex lithologies of subsurface rock formations includes the excitation of at least a portion of the rock formation with a multi-frequency electric current. The voltage resulting in the rock is measured and the phase and amplitude of such voltage is determined for each of the included frequencies. The resistivities are determined for each of the frequencies and are plotted as a function of frequency. The complex lithology of the rock formation is characterized by such plot.

13 Claims, 17 Drawing Figures

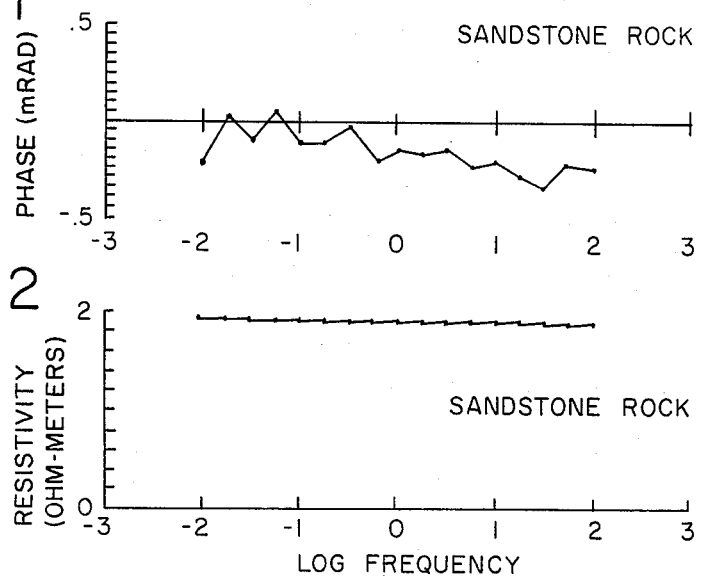
FIG. 1
FIG. 2
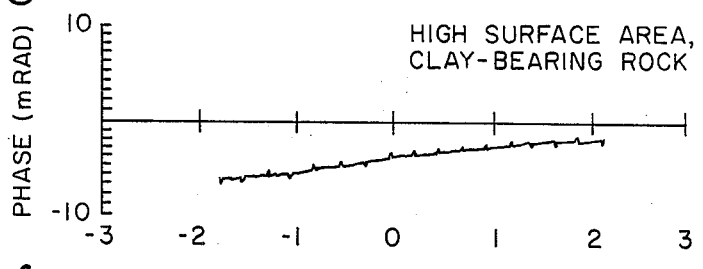
FIG. 3
FIG. 4

MULTIPLE FREQUENCY ELECTRIC EXCITATION METHOD AND IDENTIFYING COMPLEX LITHOLOGIES OF SUBSURFACE FORMATIONS

BACKGROUND OF THE INVENTION

In the search for hydrocarbons and in the evaluation of coal - and synfuel-type deposits, drilling represents an expensive commitment. A drilled hole can become worthless unless basic logs taken in such a hole can provide information vital to evaluating the potential of the surrounding area. If the lithology of the area is simple and known, analysis of the logs will give good values of the parameters needed to evaluate a reservoir and to determine reserves. However, the complex composition of mixed lithologies being encountered worldwide in oil and gas exploration and production having greatly complicated log analysis. Also, current log analysis methods are not adequate in many areas. There is, therefore, a need for logs to specifically and quantitatively identify basic rock types (limestone, dolomite, sandstone, and mixtures of these), clay type and volume, and minerals that adversely affect the logs used to estimate reserves.

SUMMARY OF THE INVENTION

The present invention is directed to a method for identifying complex lithologies of a rock formation and, more particularly, to the identification of low resistivity rock formations that may be water-free oil or gas reservoirs.

The rock formation is excited with a broad band multi-frequency electric current. The resulting voltage in the rock formation is measured and the phase and amplitude of such voltage at each of the included frequencies is determined. The resistivity of the rock formation is determined at each of the frequencies from the phase and amplitude determinations and is plotted as a function of such frequencies. The rock formation is then characterized as (i) a clean sandstone when the resistance remains constant and the phase is negligible as a function of frequency, (ii) a low resistivity, high surface area, clay-bearing rock when the real part of the impedance (resistance) remains constant and the phase is a negative value which decreases in magnitude as the current frequency increases, and (iii) a low resistivity pyrite-bearing rock when the real part of the impedance (resistance) decreases as the exciting current frequency increases and the phase is a negative value which increases in magnitude as the exciting current frequency increases.

In a more specific aspect, the multi-frequency electric current excitation may be by means of white noise, by means of a plurality of discrete sine waves which are simultaneously applied, or by means of frequency modulation with a plurality of discrete sine waves. The frequencies utilized are of a broad band width from about 0.001 hertz to 20 kilohertz.

BRIEF DESCRIPTION OF THE DRAWINGS

FIGS. 1-8 illustrate the resistivity and phase response of various complex lithologies to a broad band simultaneous frequency excitation.

DESCRIPTION OF THE PREFERRED EMBODIMENT

The electric log is a recording of the electrical resistivity of the rock formations surrounding a borehole. The measured resistivity, or electrical conduction, has been related to water saturation for many years by the equations set forth in "The Electrical Resistivity Log As An Aid In Determining Some Reservoir Characteristics", Trans. AIME, Vol. 46, pp. 54-62, 1942, by G. E. Archie. These equations, which have been so useful in the analysis of rock formations, are often referred to as "Archie's Laws". Such equations are strictly applicable to the analysis of clean formations; that is, formations with a matrix or framework that is so nearly an insulator that total electrical conductance is determined by conduction through the tortuous paths of the pore water. However, not many clean rocks exist in nature and log analysts recognized that a strict application of the Archie equations to shaly-rock analysis produced a higher than actual water saturation. More recently, analysis methods have included electrical conductance of the clay minerals found in the shaly rock in a reformulation of Archie's equations (see "Electrical Conductance In A Porous Medium", Geophysics, Vol. 48, No. 9, pp. 1258-1268, Sept. 1983, by A. E. Bussian, and "Electrical Conductivities In Oil-Bearing Shaly Sands", Soc. Petr. Eng. J., Trans. Vol. 243, pp. 107-122, 1968, by W. H. Waxman and L. J. M. Smits).

However, clay minerals are not the only minerals that can add to the total electrical conductance of a rock. Electrically conductive minerals such as pyrite- and graphite-like organic matter can contribute and even dominate electrical conductance in a rock. If this conductance is not properly taken into consideration, the log analyst can easily mistake a low resistivity and virtually water-free oil reservoir for one that is water saturated. The present invention is, therefore, directed to a new method for measuring the electrical characteristics of rocks having conductive matrix elements, such as pyrite- and other graphite-like organic matter, as well as clay minerals.

In accordance with such invention, rock resistivity is characterized in terms of its resistance and phase-angle as a function of a broad band frequency excitation of the rock. This is in contrast with the fixed, discrete frequency excitation currently in practice. The basis for a broad band simultaneous frequency excitation and a response in terms of rock resistance (real part of the impedance) and phase-angle (between excitation signal and response signal) as a function of such frequency excitation is illustrated in FIGS. 1 $\propto$ 6 for rock samples taken at different discrete frequencies over about five decades of frequencies ranging from about 0.01 hertz to 200 hertz. These Figures clearly show that clay-bearing rocks and pyrite-bearing rocks have much different frequency-dependent complex resistivity responses.

Figure 5:
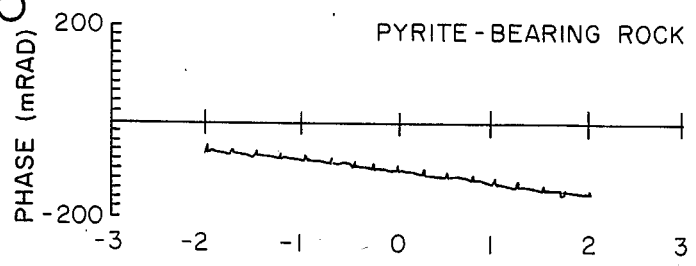
Figure 6:
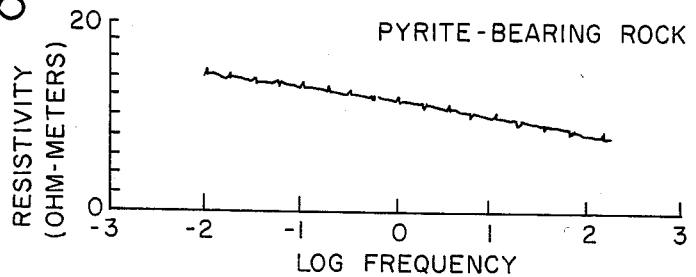

FIGS. 1 and 2 show that a clean rock, like a Berea sandstone, reacts to current excitation like a pure resistance. The phase-angle is very small, less than ±0.5 milliradians over the frequency range. FIGS. 3 and 4 show that a high surface area, clay-bearing rock (smectite) produces a measureable phase-angle that is negative and decreases in magnitude as the frequency increases. FIGS. 5 and 6 show that a rock combining despersed pyrite produces a measurable phase angle that is negative and, in contrast with the clay-bearing rock of FIGS. 3 and 4, increases in magnitude as the frequency increases. In addition, this resistivity of this pyrite-bearing rock is frequency dependent; that is, the rock resistivity decreases as the excitation frequency increases.

Figure 7:
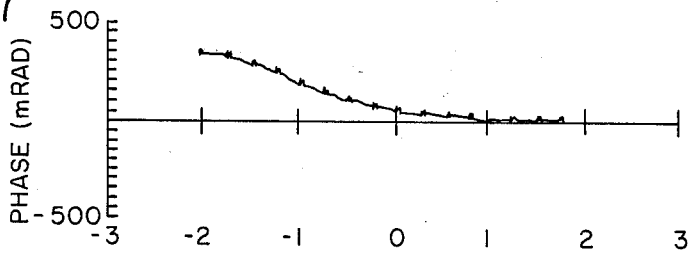
Figure 8:
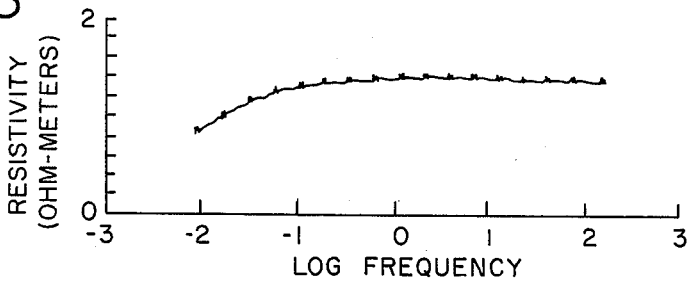

Additional Figures, FIGS. 7 and 8, depict a synthetic rock sample where two different types of electrical conduction takes place in parallel, one being purely electronic, such as continuous pyrite or graphite laminae, and the other being ionic conduction by way of the port water network in the rock sample. The rate of conduction is much faster in the purely electronic conduction path as compared to the parallel ionic conduction path. The result is a large measurable positive phase-angle at the lower excitation frequencies which decreases as the higher frequencies are approached. There is also a frequency dependance in the measured resistance which suggests that a transient is being measured rather than a true equilibrium type of phase shift. This synthetic rock represents a real case wherein a rock contains a conductive mineral, such as pyrite, in the form of an electrically continuous lamina or coating on the walls of the pore fluid network.

These eight Figures are illustrative of the phase-angle and resistivity dependence on frequency in select rocks. Such dependency suggests that a subsurface formation surrounding a borehole can be uniquely characterized as to its complex lithology by the running of the broad band multi-frequency electric log. This will eliminate water saturation measurement errors in clay-bearing and in pyrite- and other graphite-like-bearing rocks, which otherwise result if such frequency dependence is not taken into account, thereby resulting in the correct identification of low resistivity oil producing reservoirs which might otherwise be bypassed as water-saturated reservoirs.

In carrying out the method of the present invention, the rock whose complex resistivity is to be measured is electrically excited from a current source consisting of a broad band of frequencies. The measurement may be made in-situ by means of a borehole logging tool to produce an electric log of the rock formations surrounding the borehole or may be made on core samples taken from such rock formations. When the broad band multi-frequency current is injected into the rock, the voltage response of the rock is measured. This broad band multi-frequency current contains a plurality of frequencies in the range of near zero to about 20 kilohertz, and consequently, excitation of the rock with such current is at all the frequencies simultaneously. The amplitudes and phases of each frequency are known and all frequencies are preferably in phase. The particular complex lithology of the rock transforms the current signal input into a unique voltage "fingerprint"- consisting of dominant frequencies, amplitudes and phases which are different from that of the input current. This voltage response and the transform that produces it uniquely identifies the rock in terms of its electrical properties. Another way of looking at the rock is as a frequency-pass filter where certain frequencies are dominant in the measured response.

Figure 9:
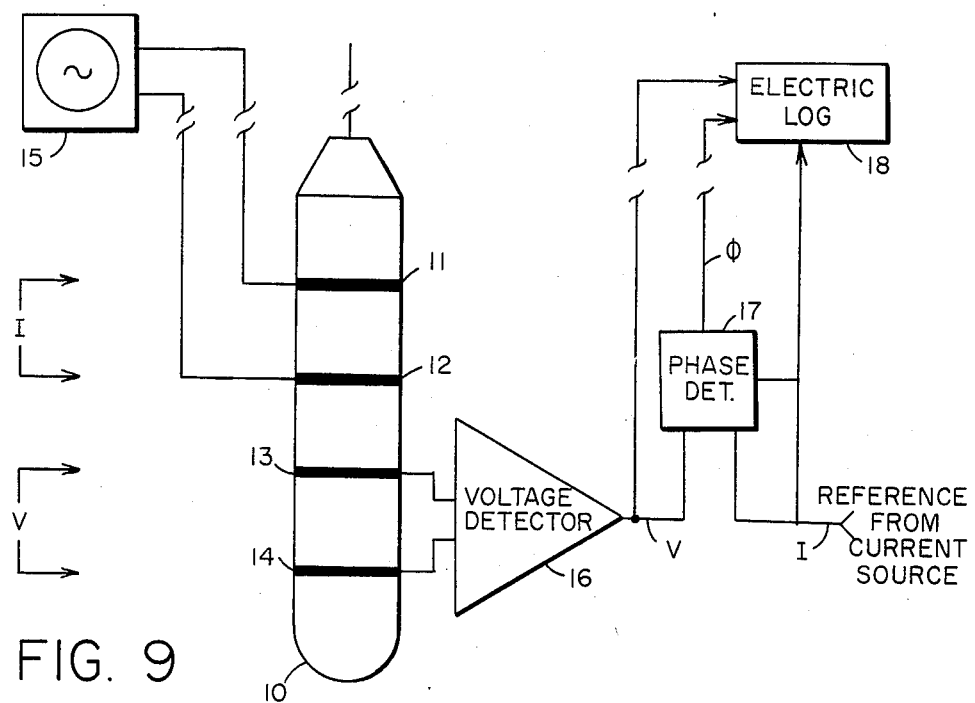
FIGS. 9 and 10 illustrate logging systems for recording an electric log of rock formations surrounding a borehole.
Figure 10:
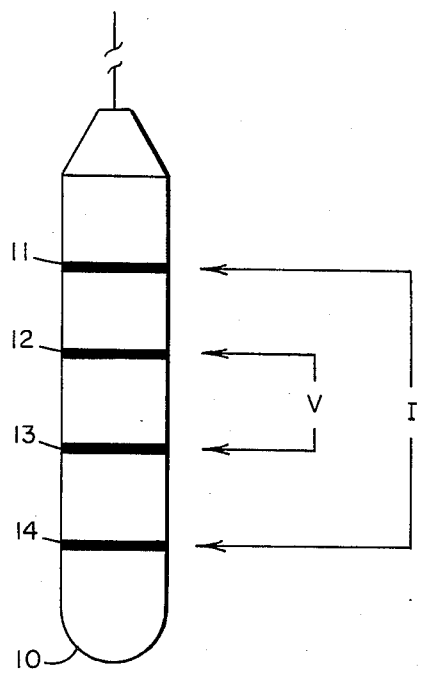

A logging tool for carrying out complex resistivity measurements for identifying the complex lithology of subsurface rock formations surrounding a borehole is illustrated in FIG. 9. The logging sonde 10 employs a dipole-dipole electrode array. The broad band frequency excitation current from the current source 15 is induced into the rock formations through the pair of current electrodes 11 and 12, and the resulting voltage is measured across the pair of voltage electrodes 13 and 14. These voltage electrodes are connected to a voltage detector 16 which measures the differential voltage across such electrodes. The differential voltage measurement is compared to the current from source 15 by detector 17 to determine the phase-angle. The voltage and phase are recorded in the form of the electric log 18. From these recorded measurements, the correct electrical resistance and reactance of the rock formation can be determined. An alternate arrangement, termed the "Wenner Array", for the current and voltage electrodes is illustrated in FIG. 10. While the dipole-dipole array of FIG. 9 will yield the best resolution, the Wenner Array will yield the best sensitivity. Other arrays are also possible, the arrays of FIGS. 9 and 10 being merely two examples. More details as to the use of such a borehole logging tool with a single discrete frequency excitation currrent source for induced polarization logging may be had by referring to U.S. Pat. No. 4,464,930, the teaching of which is incorporated herein by reference.

Figure 11:
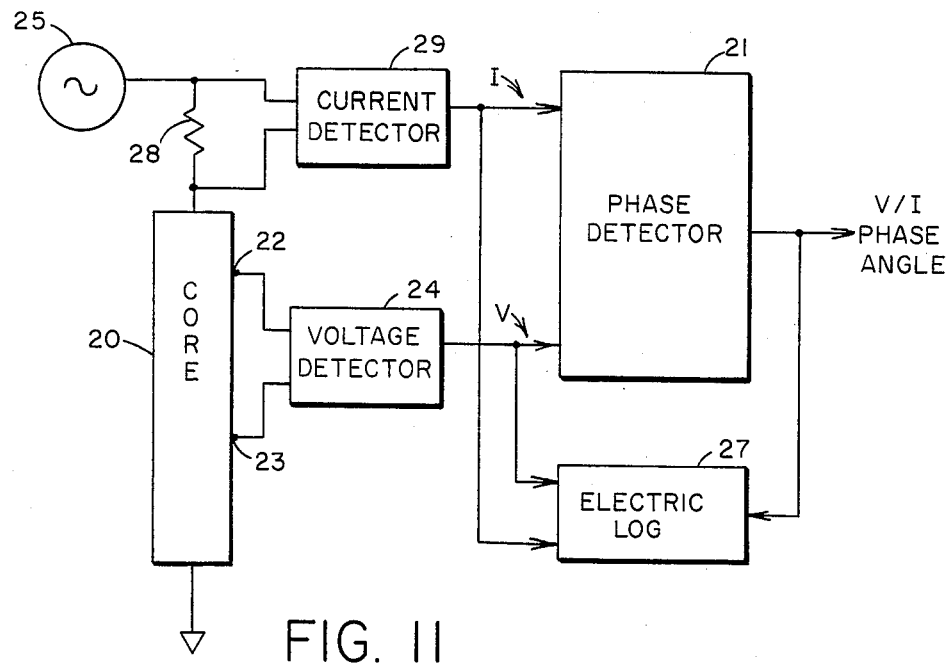
FIG. 11 illustrates a system for recording an electric log of a rock sample taken from a subsurface formation.

A laboratory analysis on core samples taken from subsurface rock formations may be carried out with the system illustrated in FIG. 11. A core sample 20 is stimulated with a broad band frequency excitation current from the current source 25. The voltage differential across the core sample 20 is measured by the voltage detector 24 at terminals 22 and 23 which are located away from the ends of the core sample so as to eliminate possible electrochemical errors resulting from the current input connection through resistor 28 and the current output connection to ground. Current through the core 20 is measured across a series resistor 28 by the current detector 29. The measured voltage and current are compared by detector 21 to determine the phase-angle between such voltage and current. This voltage current and phase-angle are recorded on the electric log 27. From these recorded measurements, the correct resistance and reactance of the core sample can be determined. More details on the use of such laboratory system for core sample electrical resistivity measurements will be made hereinafter in conjunction with the detailed description of FIGS. 15-17.

The band width of the broad band frequency excitation current required for the carrying out of the present invention will be in the range of about 0.001 hertz to about 20 kilohertz. The low frequency end is determined for a borehole logging operation by the logging speed and the depth increment of the measurement points. In general, the low frequency end of the band width is given by:

$$f(\text{hz}) = \frac{LS \text{ (ft/min)}}{60 \times \Delta \rho \text{ (ft)}} \quad (1)$$

For example, assuming a logging speed (LS) of 12 feet/minute and a depth increment ($\Delta \beta$) of 0.5 feet, the low frequency end of the band width for 1 full cycle with be 0.4 hertz.

Figure 12:
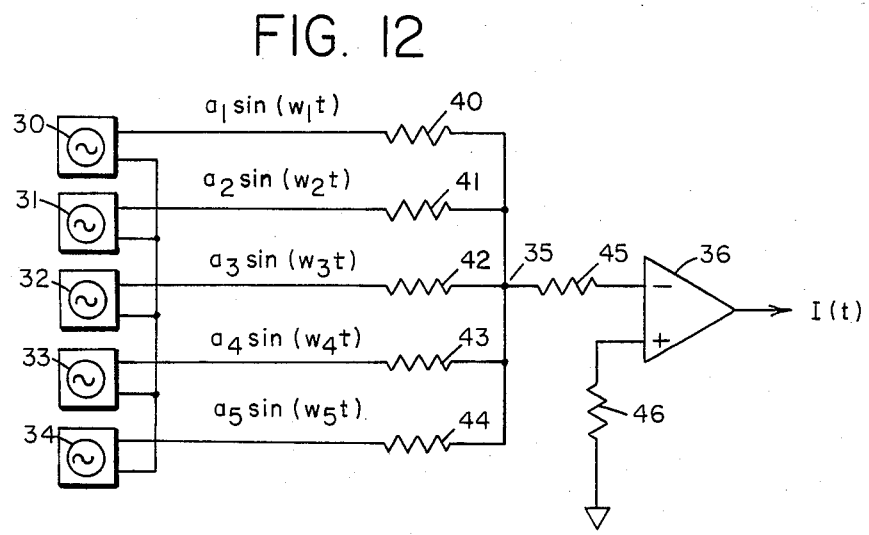
FIGS. 12-14 are detailed circuit schematics of three alternate embodiments of the current generator of FIGS. 9 and 11 for generating the multifrequency sine waveform in accordance with the present invention.

The broad band frequency excitation current may be of three types: simultaneous discrete frequencies, frequency modulation, or white noise. Referring firstly to simultaneous discrete frequency current excitation, such current excitation does not include all frequencies in a selected band width, but rather, well-defined frequencies in the band width. This type of excitation has many advantages which include not only the measurement of absolute phase, but also the measurement of resistivity as a function of frequency. Illustrated in FIG. 12 are, for example, five sine wave generators 30-34 producing five discrete signals ($f_1$-$f_5$) at 1 Hz, 10 Hz, 100 Hz, 1 kilohertz and 10 kilohertz, respectively. The outputs of each of these generators are applied through resistors 40-44 to resistor 45 and summing amplifier 36 to produce one waveform I(t) that is a mixture of these five signals. If the sine wave characteristic (sin $\omega t$) of each discrete signal is the same, and the amplitudes (a) of each is the same, the resulting signal I(t) takes the form:

$$I(t) = A \sum_{J=\omega_1}^{\omega_5} \sin(Jt + \phi_J) \quad (2)$$

where
A = gain x amplitudes and
$\phi$ = phase-angle.
The voltage response of the rock V(t) can be expressed as:

$$V(t) = B \sum_{J=\omega_1}^{\omega_n} \sin(Jt + \phi_J). \quad (3)$$

Allowing for a DC component $I_O$ and $V_O$ in both I(t) and V(t), respectively, equations (2) and (3) can be rewritten as:

$$I(t) = I_O + \sum_{J=\omega_1}^{\omega_n} A_J \sin(Jt + \phi_i), \quad (4)$$

and $$V(t) = V_O + \sum_{J=\omega_1}^{\omega_n} B_J \sin(Jt + \phi_V). \quad (5)$$

The $I_O$, $A_J{'}s$, $B_J{'}s$, $V_O,\phi_I{'}s$, and $\phi_V{'}s$ can be obtained from a matrix solution of N simultaneous equations, where N is the number of points of digitizations of both the composite I(t) and V(t) waveforms. An anaylsis of V(t) gives both the amplitude and phase at each of the discrete frequencies and logs can be plotted of phase versus frequency and resistivity versus frequency.

Figure 13:
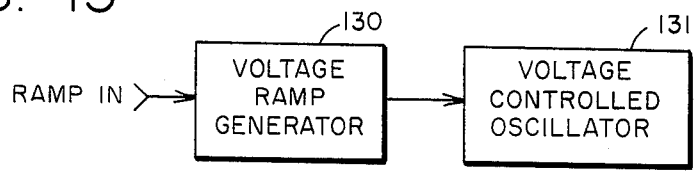

Secondly, frequency modulation current excitation is similar to simultaneous discrete frequency current excitation and differs only in that there is a sweeping through the frequency band width rather than a simultaneous generation. Illustrated in FIG. 13 is a circuit for carrying out such a frequency modulation excitation comprising a voltage ramp generator 130 and voltage controlled oscillator 131.

Figure 14:
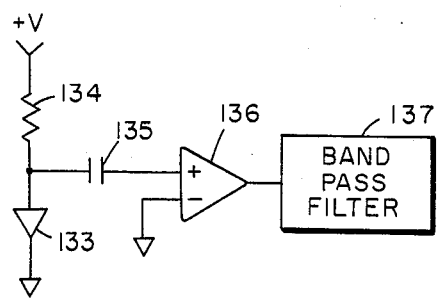

Thirdly, white noise current excitation is the combination of all frequencies in the select band width at the same average amplitudes. The unique characteristic of the rock is determined by exciting the rock with white noise and measuring the frequency content of the in-duced rock voltage. Certain of the input frequencies will still be present and certain frequencies will be absent. Those frequencies that still are present will be changed in phase and amplitude. Such an elimination of certain frequencies and the changing of the phase and amplitude of the other frequencies identifies the transfer function that is characteristic of the rock. Illustrated in FIG. 14 is a circuit for carrying out such a white noise excitation. A white noise diode 133, along with resistor 134 and capacitor 135 provide a wide flat spectra of noise. This noise is applied through amplifier 136 to band pass filter 137. The filter 137 eliminates noise outside of the band of interest.

Figure 15:
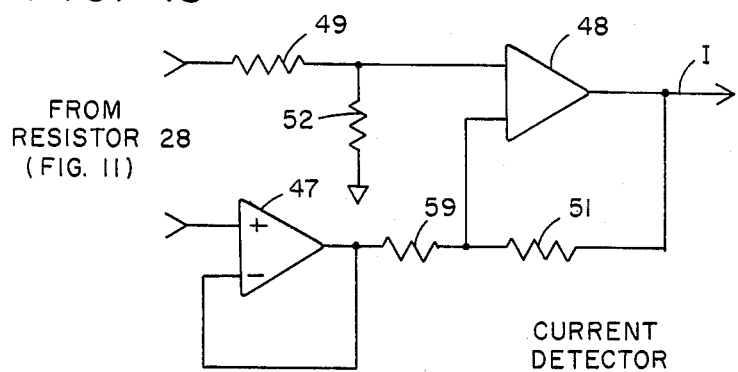
FIGS. 15-17 are detailed circuit schematics of the current, voltage and phase detectors, respectively, of FIGS. 9 and 11.

Having described the method of the present invention in connection with FIGS. 9-14, the detailed operation of the current detector 29, voltage detector 16 and 24, and phase detectors 17 and 21 of FIGS. 9 and 11 will now be described in more detail in conjunction with FIGS. 15-17. In the current detector of FIG. 15, the voltage across series resistor 28 of FIG. 11 is measured by the amplifier combination 47 and 48, amplifier 48 functioning as a differential amplifier and amplifier 47 functioning as a buffer amplifier. These amplifiers are biased by resistors 49-52. The output of amplifier 48 is an analog representation of the excitation current flow through the rock sample.

Figure 16:
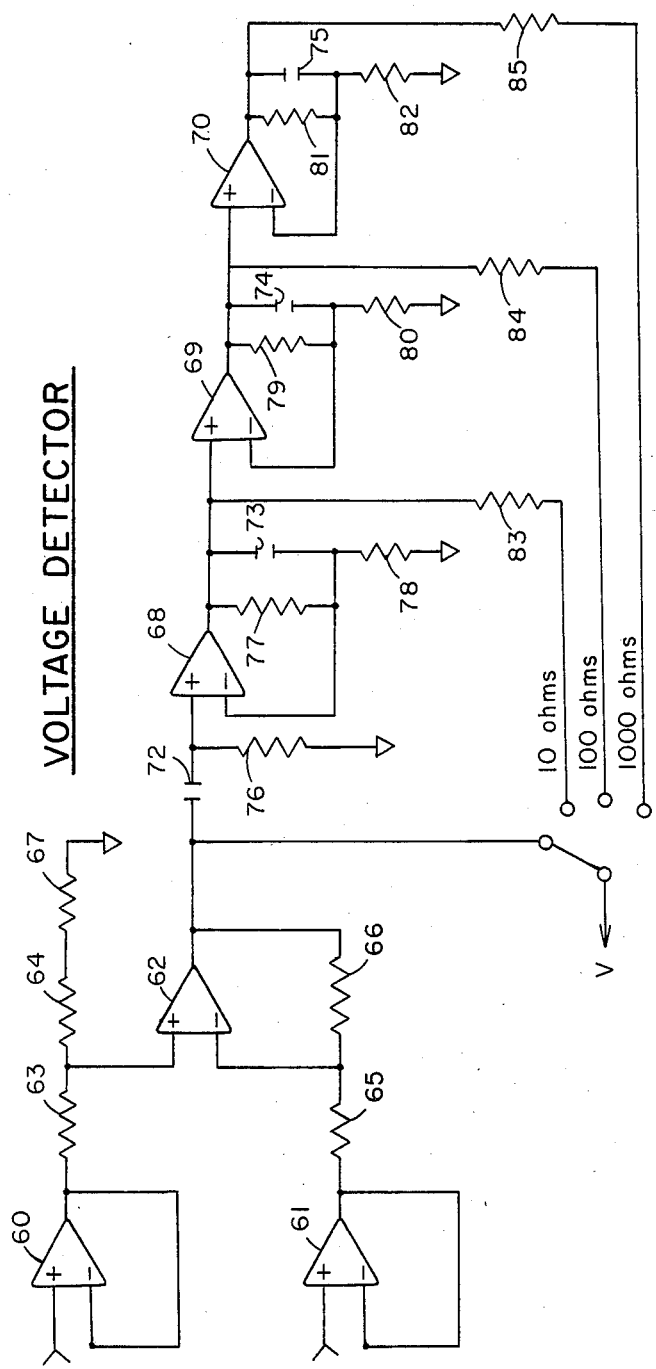

In the voltage detector of FIG. 16, the voltage differential from across the electrodes 13 and 14 of FIG. 9 or the terminals 22 and 23 of FIG. 11 is applied through preamplifiers 60 and 61 to voltage differential amplifier 62. Amplifier 62, along with amplifiers 68 $\propto$ 70, produce a desired voltage range for a given current input and rock impedance encountered. Four ranges are illustrated for rocks of impedances up to 100 ohms, 1 kilohm, 10 kilohms and 100 kilohms. The particular scale may be selected by way of switch 71. Bias conductions are set by resistors 76-85, and the output of switch 71 is an analog representation of the voltage of the rock formation or rock sample.

Figure 17:
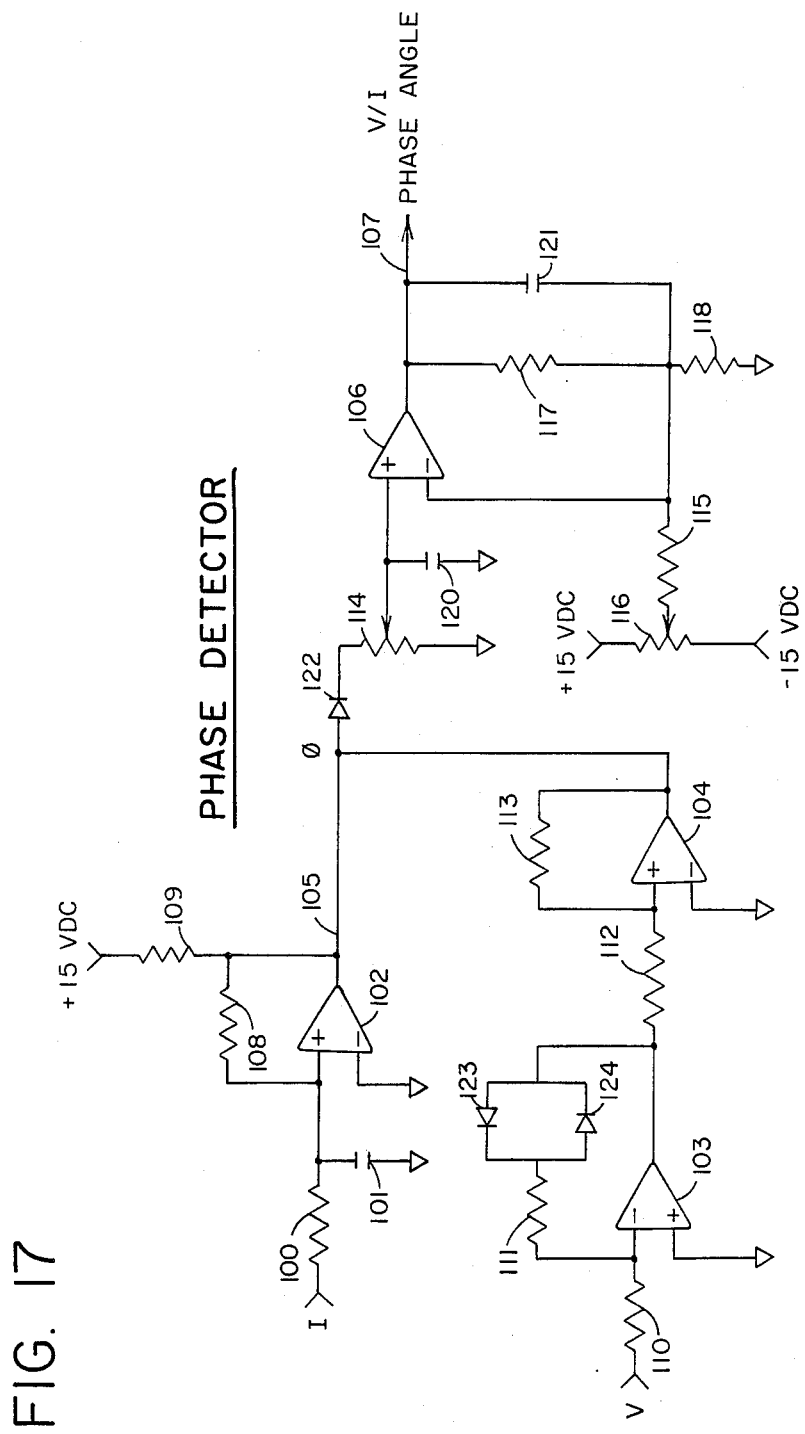

In the phase detector of FIG. 17, the current I is applied to a fixed DC time delay provided by variable resistor 100 and capacitor 101 and then to amplifier 102. The voltage V is applied to the amplifiers 103 and 104. The output of amplifiers 102 and 104 are summed to provide the phase comparison signal $\phi$ on line 105. This signal is filtered through amplifier 106 to provide a phase-angle signal on line 107 representing the amount of phase shift in the measured voltage signal created by the reactive component of the rock formation or rock sample. Bias conditions are set by resistors 108-118, capacitors 120-121, and diodes 122-124.

Having described the present invention in conjunction with the circuitry illustrated in FIGS. 9-17, it is to be understood that such circuitry is merely representative of such embodiments. In accordance with such embodiments, the following sets forth specific types of circuit components:

| Reference Designation | Description |
| --- | --- |
| Oscillators 15, 25 and 30-34 | DG 502 (Tektronix) |
| Oscillator 131 | ICL 8038 (G.E. Intersil) |
| Ramp Generator 130 | 741 (G.E. Intersil) |
| Band Pass Filter 137 | 10-3000 Hz |
| Amplifiers 47, 48, 60-62, 68-70 and 136 | OP 15 (Precision Monolithics) |
| Amplifiers 36, 102 and 104 | 339 (National Semiconductor) |
| Amplifiers 103 and 100 | TL 084 (Texas Instruments) |
| Diodes 122-124 | IN 914 (Texas Instruments) |

-continued

| Reference Designation | Description |
| --- | --- |
| Diode 133 | White Noise (Standard Reference Labs, Inc.) |
| Capacitor 72 | 0.33 µf (Kemet) |
| Capacitors 73-75 | 5 pf (Kemet) |
| Capacitor 101 | 330 pf (Kemet) |
| Capacitor 120 | 3.3 µf (Kemet) |
| Capacitor 121 | 0.1 µf (Kemet) |
| Resistors 49-51 | 4.99K (Omite) |
| Resistor 52 | 49.9K (Omite) |
| Resistors 63-66 | 20.5K (Omite) |
| Resistor 67, 101 and 114 | 5K (Omite) |
| Resistor 76 | 100K (Omite) |
| Resistors 77, 79, 81 and 110 | 10K (Omite) |
| Resistors 78, 80 and 82 | 1.1K (Omite) |
| Resistors 83-85 | 100 (Omite) |
| Resistors 108 and 113 | 820K (Omite) |
| Resistor 109 | 5.1K (Omite) |
| Resistors 111 and 112 | 1K (Omite) |
| Resistor 116 | 25K (Omite) |
| Resistor 117 | 91K (Omite) |
| Resistor 118 | 15K (Omite) |

Having now described the multi-frequency electric logging method of the present invention for identifying complex lithologies in a subsurface formation, it is to be understood that modifications and alterations may be made to the preferred embodiment without departing from the spirit and scope of the invention as set forth in the appended claims.

I claim:

1. A method for identifying complex lithologies of a rock formation comprising the steps of:
    (a) exciting at least a portion of said rock formation with a multi-frequency electric current, containing a plurality of frequencies such that all of said frequencies simultaneously excite said portion of said rock formation
    (b) measuring the resulting voltage in said portion of said rock formation,
    (c) determining the phase and amplitude of the measured voltage at each of the plurality of simultaneous frequencies included in said multi-frequency electric current,
    (d) determining the resistivity of said portion of said rock sample at each plurality of simultaneous frequencies from the amplitude of said multi-frequency current at each of said plurality of simultaneous frequencies and said determinations of phase and amplitude for said measured voltage,
    (e) recording said resistivity and said phase as a function of frequency,
    (f) characterizing said rock formation as a clean rock when said resistance remains constant and said phase is negligible as a function of exciting current frequency,
    (g) characterizing said rock formation as a low resistivity, high surface area, clay bearing rock when said resistance remains constant and said phase is a negative value which decreases in magnitude as said exciting current frequency increases, and
    (h) characterizing said rock formation as a low resistivity, pyrite-bearing rock when said resistance decreases as said exciting current frequency increases and said phase is a negative value which increases in magnitude as said exciting current frequency increases.

2. The method of claim 1 wherein said excitation is by means of an electric current comprised of white noise.

3. The method of claim 2 wherein all frequencies of said white noise electric current are of the same amplitude.

4. The method of claim 1 wherein said excitation is by means of an electric current comprised of a plurality of discrete sine waves.

5. The method of claim 4 wherein all frequencies of said discrete sine waves are of the same amplitude.

6. The method of claim 1 wherein said plurality of frequencies are in phase.

7. The method of claim 5 wherein said multi-frequency electric current, I(t), is represented by the following expression:

$$I(t) = I_O + \sum_{J=\omega_1}^{\omega_n} A_J \sin(Jt + \phi_j),$$

where
    $I_O$ = D.C. current component,
    A = gain x amplitudes,
    $\phi$ = phase-angle.

8. The method of claim 4 wherein said excitation is by means of an electric current which is frequency modulated with said plurality of discrete sine waves.

9. The method of claim 1 wherein said multi-frequency electric current comprises a band width of from about 0.001 hertz to about 20 kilohertz.

10. The method of claim 9 wherein said multi-frequency electric current comprises a plurality of sine waves at discrete decade frequencies.

11. The method of claim 11 wherein said discrete decade frequencies include 1 hertz, 10 hertz, 100 hertz, 1 kilohertz, and 10 kilohertz.

12. A method for producing a multi-frequency electric log of a subsurface rock formation surrounding a borehole, comprising the steps of:
    (a) traversing said borehole with a logging tool housing a multi-frequency electric current generator which simultaneously generates a plurality of frequencies,
    (b) introducing said multi-frequency electric current from said generator into said rock formation through a pair of in-situ current electrodes as said tool traverses the borehole,
    (c) measuring the resulting voltage in said rock formation through a pair of in-situ voltage electrodes, said voltage representing the reactive component of the electrical impedance of said rock formation,
    (d) determining the phase and amplitude of said measured voltage at each of the plurality of simultaneous frequencies included in said multi-frequency electric current,
    (e) determining the resistivity of said rock formation at each of said plurality of simultaneous frequencies included in said multi-frequency electric current,
    (f) plotting said resistivity, and phase as a function of frequency,
    (g) characterizing said rock formation as a clean rock when said resistance remains constant and said phase is negligible as a function of exciting current frequency,
    (h) characterizing said rock formation as a low resistivity, high surface area, clay bearing rock when said resistance remains constant and said phase is a negative value which decreases in magnitude as said exciting current frequency increases, and (i) characterizing said rock formation as a low resistivity, pyrite-bearing rock when said resistance decreases as said exciting current frequency increases and said phase is a negative value which increases in magnitude as said exciting current frequency increases.

13. The method of claim 12 wherein the logging speed of said tool is selected so that the low frequency end of the band width of said multi-frequency electric current is established in accordance with the following expression:

$$f = LS/60 \times \Delta\rho,$$

where
f = frequency in hertz,
LS = logging speed in feet per minute, and
$\Delta\rho$ = depth increment.

* * * * *